Patented Mar. 28, 1939

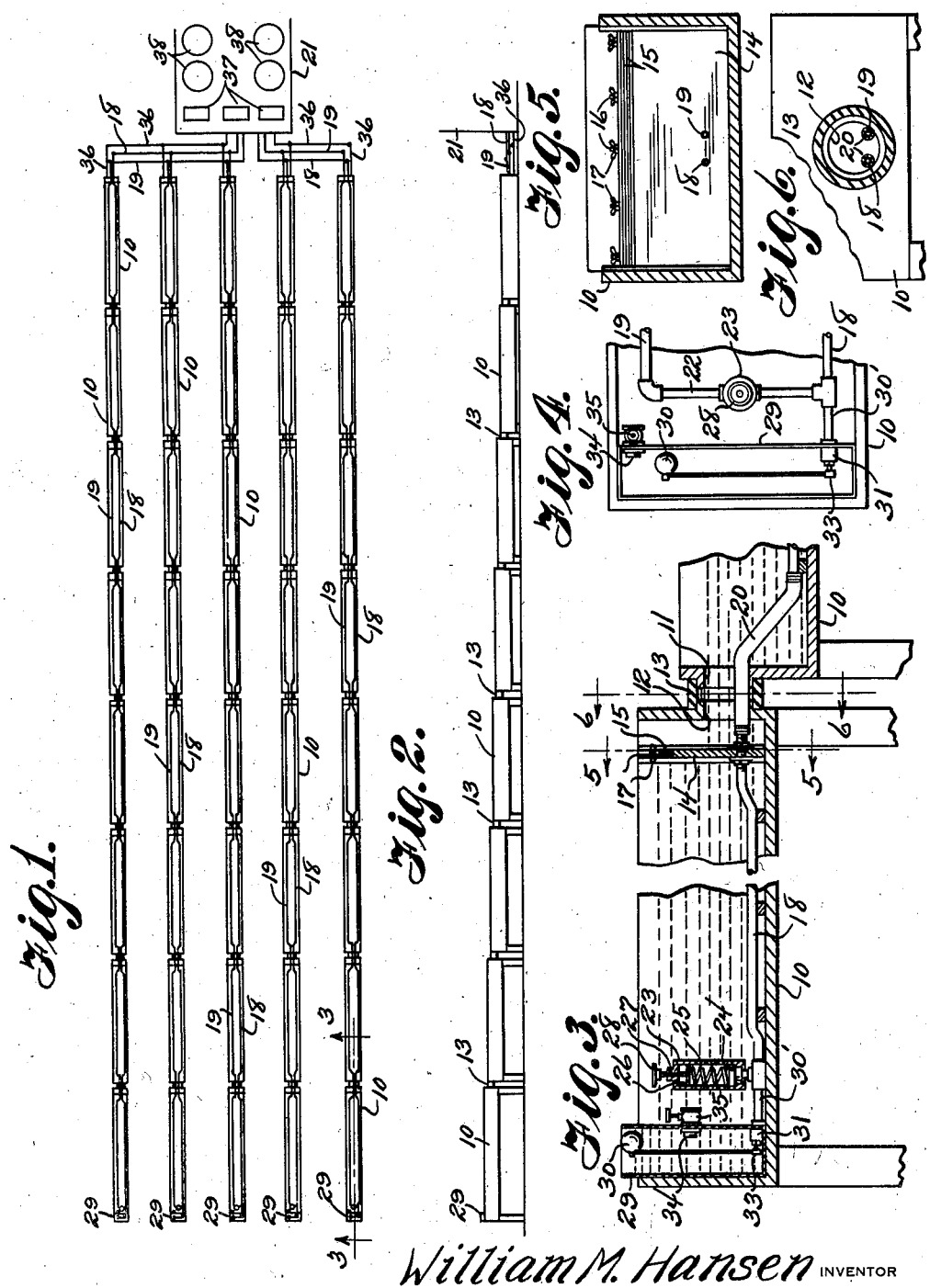

2,152,254

UNITED STATES PATENT OFFICE 2,152,254

APPARATUS FOR WATER CULTURE OF VEGETATION

William M. Hansen, Phoenix, Ariz.

Application March 31, 1938, Serial No. 199,272

4 Claims. (Cl. 47—14)

This invention relates to apparatus for water culture of vegetation and has for an object to provide apparatus for controlling treated irrigation water when functioning in circuits of circulation in conserving systems of irrigation and culture of vegetation.

For the purpose of this invention the phrase "treated irrigation water" means irrigation water of any description which has been treated chemically or physically, such treatment including the addition of chemicals, cultures, colloids, emulsions, medicaments, raw or treated water, liquid fertilizers, gas or gases, the exposure to light rays or electric rays or currents, heating or cooling, or any treatment of or addition to said irrigation water intended to be for the irrigation and culture of vegetation; the phrase "functioning in circuits of circulation" means performing continuous or intermittent circuits of circulation, the alternate periods of flow and rest in said intermittent circuits being of any desired duration; the phrase "conserving systems of irrigation and culture of vegetation" means any system of irrigation and culture of vegetation from which seepage of its contained irrigation water is prevented and into which seepage may be admitted; and the term "vegetation" means all plant life.

Heretofore the chemical culture of plant life in water tight units has been attended with the difficulty of maintaining the desired standardization and quantity of the treated irrigation water in each of said units. With this disadvantage in mind in the present invention the treated irrigation water functions in circulation through units, arranged singly or in connected groups as concerns their contained irrigation water, which water is controlled as to standardization and circulation from a single point of re-treatment in the system, excepting only such infrequent adjustment of valves, gates, and so forth, as are not desirable or practical of remote control.

Various systems of growing plants in nutrient solutions without the assistance or use of soil, sand, gravel or other form of root anchorage have been proposed but it is an object of the present invention to provide apparatus which will accommodate the use of all forms of root anchorage in the solutions themselves.

In proposed forms of apparatus for chemical culture of vegetation, temperature control has been difficult to maintain. An object of the present invention is therefore to provide temperature conditioning within narrow limits through the medium of the circulation of the treated water itself.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a plan view of apparatus for water culture, constructed in accordance with the invention.

Figure 2 is a side elevation of the apparatus shown in Figure 1.

Figure 3 is a longitudinal sectional view of a terminal unit taken on the line 3—3 of Figure 1.

Figure 4 is a plan view of the float control tank and relief valve shown at the left of Figure 3.

Figure 5 is a cross sectional view taken on the line 5—5 of Figure 3 and showing the gate through which the irrigation water pipes pass.

Figure 6 is an enlarged cross sectional view taken on the line 6—6 of Figure 1 and showing a gasket forming a flexible connection between adjacent units.

Referring now to the drawing in which like characters of reference designate similar parts in the various views, 10 designates a unit of the system, the present embodiment illustrating a plurality of parallel rows of such units. Each unit may be for example a box formed of redwood or other material one of the ends being provided with an inlet opening 11 and the opposite end being provided with an outlet opening 12, these openings being defined by flanges upon which rubber or other flexible gaskets 13 are supported to provide a yielding connection between adjacent units. Near the outlet end of each unit a gate 14 is provided over which treated irrigation water may flow into the next lowermost unit, all of the units being arranged in stepped relation as shown in Figure 2. The height of the gate 14 may be adjusted through the instrumentality of shims 15 removably secured in place by screws 16 and wing nuts 17.

Each unit is provided with a treated water supply pipe 18 and a treated water return pipe 19 adapted to be submerged at all times below the water level of the unit. Lengths of flexible hose 20 form flexible sections of the pipes to conduct the same through the inlet and outlet openings of adjacent units so that settling or other deforming of the units will not interfere with circulation of the treated water through the pipes.

The pipes pass through the gates as best shown in Figures 3, 5 and 6, and are connected together in the unit farthermost from the retreatment station 21 by a pipe 22, best shown in Figure 4. A pressure relief valve controls outward flow in the supply pipe 18 and return flow in the return pipe 19 and comprises a perforated casing 23 having a valve 24 loose therein and movable by pressure in the supply pipe against the tension of a helical spring 25. The upper end of the spring bears against the disc 26 carried by a feed screw 27 which terminates in a handle 28 by means of which the feed screw may be fed downwardly or upwardly in the casing to respectively compress the spring to hold the valve 24 closed or relieve the valve of pressure to release the spring and permit flow from the supply pipe through the perforations in the casing into the unit. By regulating this valve the rate of flow from unit to unit over the gates may be controlled.

It will be noted that when the valve 24 is partly open there will be some flow in the return pipe and some flow into the last unit of the row and this is advantageous where temperature control within a few degrees is desirable since the return of some of the treated water to the central retreatment station permits of reheating to compensate for fluctuations in temperature. It will be here pointed out that by virtue of the supply and return pipes being submerged in the water of the units these pipes will be insulated by the water against the effects of atmospheric temperatures surrounding the vegetation.

The rate of flow may be further simultaneously controlled while the pressure relief valve is functioning or independently of the valve. For this purpose a tank 29 is disposed in the outermost unit and is connected at the bottom by a pipe 30 to the supply pipe 18, as best shown in Figures 3 and 4. A valve 31 is disposed in the tank and controls flow from the supply pipe. A float 30 is connected to the valve stem 33 and the purpose of this float is to automatically control flow of irrigation water from the supply pipe into the tank.

The tank is provided in one side below the water level of the outermost unit with an outlet pipe 34 which is controlled by a valve 35. When the valve 35 is opened water from the tank will flow under pressure through the valve controlled pipe 34 into the outermost unit. The float controls the valve 31 to constantly replenish the contents of the tank to maintain a water level therein above the water level in the outermost unit. The irrigation water flowing into the unit nearest the retreatment station 21 is provided with an outlet pipe 36, best shown in Figure 1, and this pipe returns the irrigation water to the retreatment station.

The retreatment station is of conventional type and is provided with suitable pumps 37 for pumping the treated irrigation water from tanks 38 into the system. The pumps and the tanks are of sufficient capacity to maintain the desired standardization and quantity of the treated irrigation water in each of the units.

From the above it will be seen that the treated irrigation water functions in circuits of circulation through water tight units forming a conserving system of irrigation and culture of vegetation and that the treated irrigation water in the system is efficiently controlled as to standardization and circulation from a single point of retreatment in the system.

What is claimed is:

1. Apparatus for water culture of vegetation comprising a plurality of rows of water tight units, treated water supply and return pipes extending longitudinally of the rows and submerged in the units, a central retreatment station connected to the pipes for controlling standardization and circulation in the apparatus, a pressure relief valve connected to the pipes in the unit at that end of the row most remote from the retreatment station, said valve being adjusted to permit the escape of part or all of the water into the units, said units being disposed in stepped relation progressively from a high point at the remote end of the row to the low point at said retreatment station, and gates in the unit permitting the treated irrigation water escaping from each upper unit to the next adjacent lower unit.

2. Apparatus for water culture of vegetation comprising rows of units, treated water supply and return pipes extending longitudinally thereof and submerged below the water level of the unit, said units being stepped, gates in the units permitting overflow of treated water from one unit into the next unit, a central retreatment station connected to said pipes for maintaining standardization and circulation, a tank in the unit most remote from the retreatment station, a float controlled valve in said pipe connected to the supply pipe and adapted to permit the supply pipe discharging into said tank, and a valve controlled outlet in said tank adapted to permit the escape of contents of the tank into said outermost unit.

3. Apparatus for water culture of vegetation comprising a row of units, water supply and return pipes extending longitudinally thereof and submerged in the units, each unit having an outlet opening at one end and an inlet opening at the opposite end, flanges defining said openings, rubber gaskets seated on said flanges and forming yielding connections between each two contiguous units, flexible hose forming sections of said water supply and return line passing through said flanges to compensate for deforming of the units from a predetermined position, gates in said units permitting overflow from one unit to the next adjacent unit through said openings, said pipes passing through said gates, and means in the outermost unit of each row of units selectively permitting escape of part or all of the treated water from the supply line into said outermost unit.

4. Apparatus for water culture of vegetation comprising a row of stepped water tight units, a central retreatment station at one end of the row of units, treated water supply and return pipes extending from the station longitudinally of the units and submerged in the units, means in the unit most remote from the station permitting of escape of the treated water wholly or in part of the said outermost unit, gates in the units permitting of overflow from one unit into the next unit in a direction toward said station, a drain pipe connected with the unit nearest said station and entering the station for returning water from the units to the station, and means for adjusting the height of the gates to control depth of treated water in the units.

WILLIAM M. HANSEN.